United States Patent

Phillips et al.

[11] Patent Number: 5,890,748
[45] Date of Patent: Apr. 6, 1999

[54] COMPOSITE MALE HOSE COUPLER

[75] Inventors: Daniel L. Phillips, Pioneer; Steven D. Champion, Blakelee; Michael E. Allman, Montpelier, all of Ohio

[73] Assignee: Winzeler Stamping Company, Montpelier, Ohio

[21] Appl. No.: 949,613

[22] Filed: Oct. 14, 1997

[51] Int. Cl.⁶ ................................................ F16L 13/08
[52] U.S. Cl. .................... 285/289.5; 285/256; 228/249
[58] Field of Search ................................ 285/256, 259, 285/289.5; 228/56.3, 133, 245, 249, 250, 251, 253

[56] References Cited

U.S. PATENT DOCUMENTS

| | | | |
|---|---|---|---|
| 1,974,383 | 9/1934 | Wallace | 285/258 |
| 1,986,010 | 1/1935 | O'Haughlin | 285/289.5 |
| 2,216,839 | 10/1940 | Hoffman | 285/258 |
| 2,262,228 | 11/1941 | Garretson | 285/259 X |
| 2,268,142 | 12/1941 | Lusha et al. | 285/258 |
| 2,781,785 | 2/1957 | Davies | 285/289.5 |
| 3,345,090 | 10/1967 | Weatherhead et al. | 285/256 |
| 4,690,435 | 9/1987 | Manning et al. | 285/259 X |
| 4,850,620 | 7/1989 | Puls | 285/258 X |

*Primary Examiner*—Dave W. Arola
*Attorney, Agent, or Firm*—Donald R. Fraser

[57] ABSTRACT

A composite male hose coupler comprising a metallic tail piece; an externally threaded male fitting; and means for affixing the tail piece to the male fitting; and a method of manufacture thereof, are disclosed. The metallic tail piece is formed of annealed brass tube stack and includes a first cylindrical portion and a second cylindrical portion joined together by a radially outwardly extending flange generally perpendicular to the longitudinal axes of the first and second cylindrical portions. The externally threaded male fitting is formed of machined brass stock and includes external threads on the outer surface and an annular lip for receiving the flange of the tail piece. A solder material is employed to produce a fluid-tight seal between the tail piece and the male fitting.

4 Claims, 1 Drawing Sheet

COMPOSITE MALE HOSE COUPLER

FIELD OF THE INVENTION

This invention pertains generally to hose couplers, and more particularly to composite male hose couplers for the ends of flexible, resilient hoses of the so-called garden hose type.

BACKGROUND OF THE INVENTION

Garden hoses made of various forms of rubber and plastic are generally provided with so-called male and female end couplers by which the hoses are connected to one another, to faucets or spigots supplying liquid thereto, and to nozzles, sprinklers, etc. for dispensing the liquid. On currently marketed hoses such couplers, which are permanently affixed to the hose ends during production of the hose assembly, commonly comprise threaded male and female couplers, made of brass or the like, which include a ferrule placed over the outer end of the hose. A cylindrical tail piece, again of brass or the like, is introduced into the hose end and permanently expanded outwardly to urge the hose into liquid-tight engagement with the ferrule. These threaded male and female couplers may also be formed of plastic. In such couplers, plastic cylindrical tail piece is inserted into the hose end and a clamp member, generally of brass, surrounds the external periphery of the hose and is crimped inwardly after being placed around the hose, to urge the hose into liquid-tight engagement with the tail piece.

The male couplers have heretofore generally been fabricated either entirely of metal or entirely of plastic. However, each of these has certain disadvantages. Thus, metallic couplers are relatively costly to fabricate and assemble. Both the material itself and the forming process are comparatively expensive. In order to economically manufacture the metallic couplers, the couplers have been stamped from annealed brass stock. Such metallic couplers are also susceptible to being permanently deformed or crushed under heavy loads, such as when run over by an automobile tire, and thus made unusable.

SUMMARY OF THE INVENTION

In accordance with the invention, there is provided a composite male hose coupler comprised of a stamped metallic tail piece to which an externally threaded metallic fitting has been integrally joined. The externally threaded metallic fitting is typically formed of a brass stock having high resistance to compression. The metallic tail piece, which is typically preferably formed of annealed brass stock by a stamping operation, due to the resultant economics, includes a first cylindrical portion and a second cylindrical portion joined to be first portion by a radially outwardly extending flange generally perpendicular to the longitudinal axes the first and second cylindrical portions; an externally threaded male fitting including a main cylindrical body portion having threads formed on the outer surface thereof, one end of the body portion terminating in an annular lip portion for receiving the outwardly extending of the tail piece; and means for affixing flange of the tail piece to the annular lip of the male fitting to produce a fluid-tight connection therebetween.

The composite coupler may be affixed to the hose end by inserting the cylindrical portion of the metallic tail piece into the end of the hose and placing a ferrule around the outer circumference of the hose end. The cylindrical portion of the tail piece is then expanded in the conventional manner so that the hose is urged into liquid-tight engagement with the ferrule.

BRIEF DESCRIPTION OF THE DRAWINGS

The above as well as other objects and advantages of the invention may be readily understood by one skilled in the art from reading the following detailed description of an embodiment of the invention when considered in the light of the accompanying drawings, in which.

DETAILED DESCRIPTION OF THE PREFERRED EMBODIMENT

Figure 1:
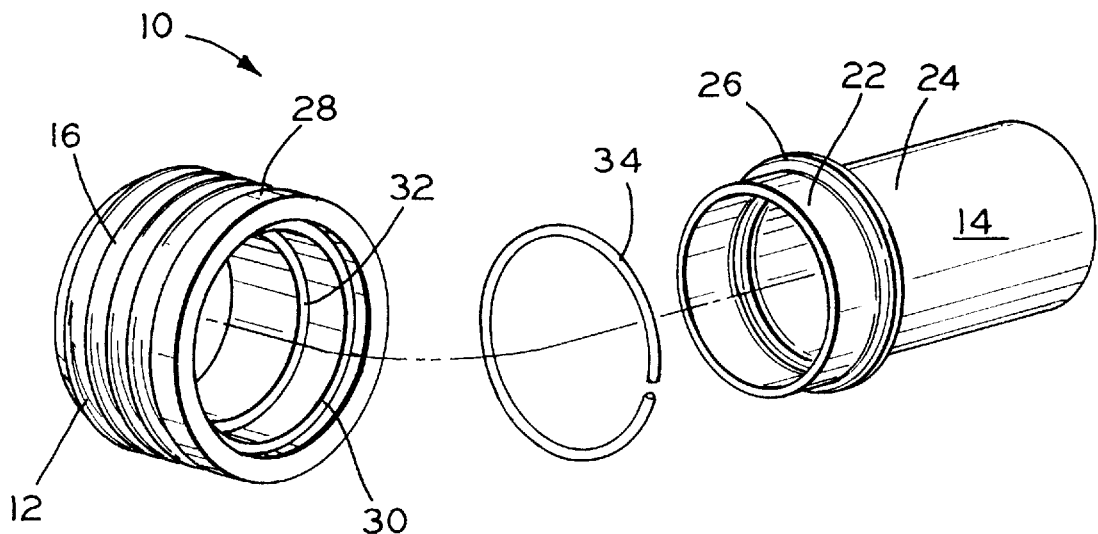
FIG. 1 is an exploded perspective view of a male hose coupling incorporating the features of the invention.

Referring now to the drawings, there is illustrated generally at 10 a composite male hose coupler embodying the features of the present invention.

The hose coupler 10 includes a metallic fitting 12 which is configured to receive a stamped metal tail piece 14. The fitting 12 is typically formed of a machined brass stock having external threads 16 for mating with an appropriate female coupler. The end segment of a hose 18 is permanently affixed to the hose coupler by the combination of the metallic tail piece 14 and a ferrule 20. The male coupler 10 of the present is adapted to be threadably interconnected in the usual manner with a conventional female hose coupler (not shown) as well as with a nozzle, sprinkler and other liquid dispensing device.

The metallic tail piece 14 includes a first cylindrical portion 22, and a second cylindrical portion 24 joined to the first cylindrical portion 22 by a radially outwardly extending flange 26 formed during a stamping operation by adjacent number sections of the cylindrical stock from which the part is found being bent upon themselves. The resulting flange 26 extends outwardly and annularly around the entire periphery at the juncture of the first and second cylindrical portions 22, 24.

It will be noted that in the preferred embodiment of the invention the diameter of the first cylindrical portion 22 is slightly larger than the diameter of the second cylindrical portion 24.

The externally threaded metallic fitting 12 is formed to include a lip portion 28 which is formed to extend around the entire periphery thereof.

The inner wall of the lip portion 28 of the fitting 12 is provided with a first shoulder portion 30 and a second shoulder portion 32.

In the preferred embodiment of the invention, the first cylindrical portion 22 of the tail piece 14 is inserted into the fitting 12 such that the flange 26 is seated on the shoulder portion 30 of the lip 28 and the end of the cylindrical portion 22 is butted against the second shoulder 32. A ring 34 of solder is typically initially positioned to extend completely around the first cylindrical portion 22 so that when it is heated to the melting temperature thereof it will flow to be physically positioned between the adjacent outer surfaces of the first cylindrical portion 22 and the flange 26 and the facing surfaces of the shoulder 30 of the lip portion 28 of the fitting 12.

Figure 2:
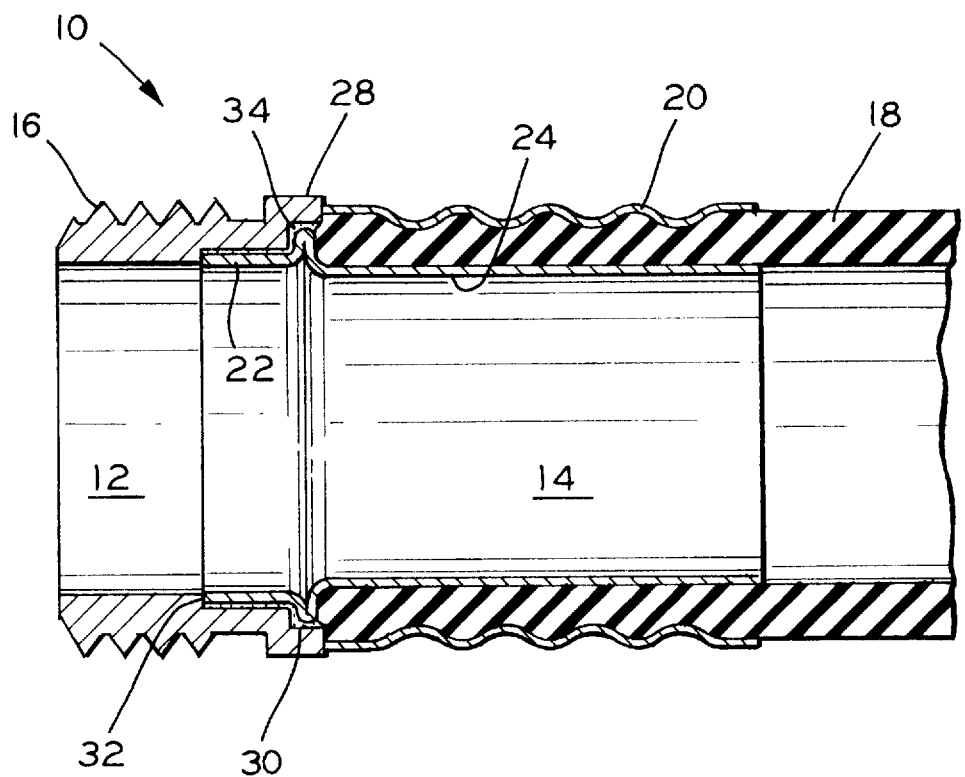
FIG. 2 is a sectional view of the coupling illustrated in FIG. 1 and an associated garden hose.

The assembly of the fitting 12, the tail piece 14, and the ring 34 of solder is exposed to sufficient heat energy, from a gas jet, for example, to cause the solder to melt and flow into the space between the adjoining surfaces of the fitting 12 and the tail piece 14, as illustrated in FIG. 2, and is thence suitably quenched by air or water spray, for example, to cause the solder to solidify and thereby form fluid-tight seal between the fitting 12 and the tail piece 14.

It will be appreciated that the resultant composite male hose coupler and the method for forming it are relatively inexpensive when compared to machining the entire coupler from a brass rod stock. Also, notwithstanding the reduction in cost, the resultant coupler is designed to withstand compression levels of approximately 1100 pounds, compared to a typical coupler formed by a stamping process from annealed brass tubing which can withstand compression load approximately 125 pounds.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A composite male hose coupler comprising:

a stamped metallic tail piece formed of annealed brass including a first cylindrical portion, and a second cylindrical portion joined to the first portion by a radially outwardly extending flange generally perpendicular to the longitudinal axes of the first and second cylindrical portions;

an externally threaded male fitting including a main cylindrical body portion having threads formed on the outer surface thereof, one end of the body portion terminating in an annular lip portion including a shoulder for receiving the outwardly extending flange of said tail piece; and solder affixing the flanges of said tail piece to the annular lip of said male fitting to produce a fluid-tight connection therebetween.

2. A composite male hose coupler as defined in claim 1, said coupler being affixed to the end segment of a hose, wherein a cylindrical portion of said metallic tail piece has been expanded to urge the hose into engagement with a ferrule surrounding the hose.

3. A composite male hose coupler as defined in claim 1 wherein said externally threaded male fitting is by machining brass stock having high compression strength.

4. A method of producing a composite male hose coupler including the steps of:

providing a metallic tail piece including a first cylindrical portion, and a second cylindrical portion joined to the first portion by a radially outwardly extending flange generally perpendicular to the longitudinal axes of the first and the second cylindrical portions;

placing a solder wire around the second cylindrical portion adjacent the flange;

positioning an externally threaded coupling adjacent said tail piece, said coupling including a main cylindrical body portion having threads formed on the outer surface thereof, one end of the body portion terminating in an annular lip portion receiving the outwardly extending flange of said tail piece and the solder wire;

applying heat energy to said tail piece, said solder wire, and said coupling causing the solder to cause a fluid-tight connection between said tail piece and coupling upon the removal of the heat energy therefrom.

* * * * *